United States Patent

Maldonado

[11] Patent Number: 5,772,152
[45] Date of Patent: Jun. 30, 1998

[54] INTERACTING SPOOLS FOR A CORD HOLDER

[76] Inventor: Sandra Birdsall Maldonado, 4547 Louisa Dr., New Orleans, La. 70126

[21] Appl. No.: 705,296

[22] Filed: Aug. 29, 1996

[51] Int. Cl.⁶ ................................................. B65H 16/04
[52] U.S. Cl. ..................... 242/597; 242/386; 242/388.5
[58] Field of Search ..................... 242/386, 597, 242/404, 406, 405, 597.8, 388.1, 388.5

[56] References Cited

U.S. PATENT DOCUMENTS

| | | | |
|---|---|---|---|
| 1,364,031 | 12/1920 | Brenizer | 242/405 X |
| 1,609,309 | 12/1926 | Renz | 242/388.1 |
| 1,851,722 | 3/1932 | Moore | 242/597.8 X |
| 2,656,991 | 10/1953 | Neely | 242/388.5 |
| 2,834,078 | 5/1958 | Brundage . | |
| 2,925,230 | 2/1960 | Joy et al. | 242/386 X |
| 3,021,087 | 2/1962 | Rudolph . | |
| 3,208,121 | 9/1965 | Price | 242/388.1 |
| 3,272,453 | 9/1966 | Hallock | 242/386 |
| 3,279,010 | 10/1966 | Misanchuk | 242/388.1 |
| 3,874,608 | 4/1975 | Quenot | 242/405 |
| 3,877,565 | 4/1975 | Suzaki | 242/597.8 X |
| 3,924,819 | 12/1975 | Lapinskas . | |
| 3,997,124 | 12/1976 | Sato | 242/597.8 X |
| 4,390,142 | 6/1983 | Cheng | 242/388.1 |
| 4,721,268 | 1/1988 | Lerner et al. . | |
| 5,230,480 | 7/1993 | Perry | 242/386 |

FOREIGN PATENT DOCUMENTS

| | | | |
|---|---|---|---|
| 816441 | 10/1951 | Germany | 242/405 |
| 616053 | 1/1961 | Italy | 242/386 |

*Primary Examiner*—Daniel P. Stodola
*Assistant Examiner*—Gregory J. Strimbu
*Attorney, Agent, or Firm*—Patent & Trademark Services; Thomas Zack; Joseph H. McGlynn

[57] ABSTRACT

A cord holder having an outer rotatable housing with an inwardly extending inner spool which engages and rotates within a concentrically mounted larger stationary hollow cord storage spool support. The inner spool fits within the hollow larger spool support in a telescoping manner. Two self-stick pads mount the spool support to a vertical support surface such as an appliance, wall or the like. A cord stored around the larger hollow spool support may be withdrawn through a hole in the outer housing when needed. In an alternate embodiment, a housing with a cord exit opening has a center spool containing a cord around it. The spool is fixed to the housing while a rotatable flat support with a center circular indentation can be mounted on and rotated around a spool extension. An appropriate opening in the flat support allows the stored cord to be withdrawn from the spool.

3 Claims, 2 Drawing Sheets

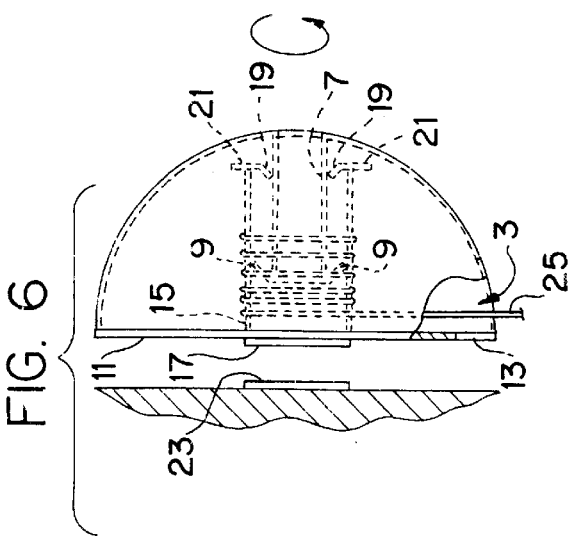
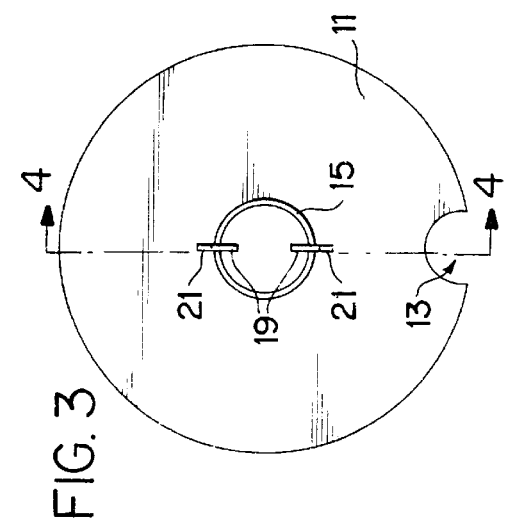
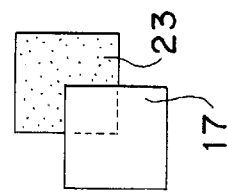
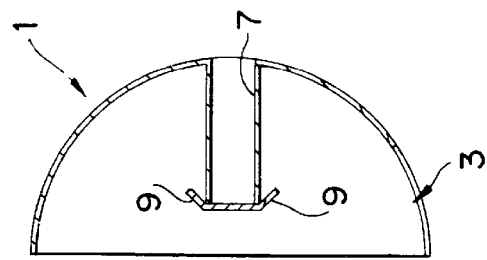
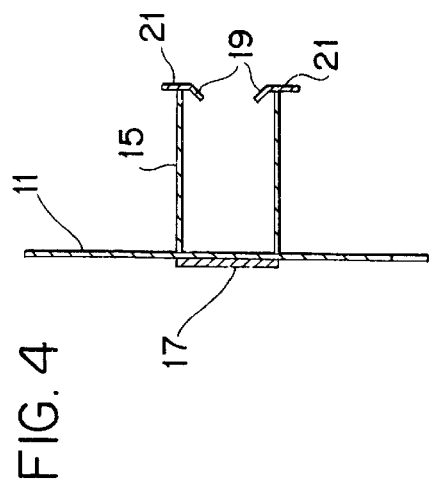
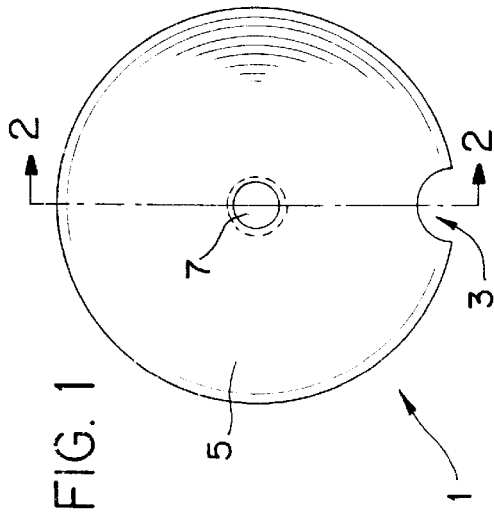

5,772,152

INTERACTING SPOOLS FOR A CORD HOLDER

BACKGROUND OF THE INVENTION

The present invention relates to a cord holder such as a holder for an electric wire cord. This holder can be attached to almost any clean and dry surface including appliances, countertops and walls. The holder is made up of: a semi-hemispheric shape curved cup housing surface having an inner spool and an exit opening; a back wall support member with an outer cord holding spool having extensions; and a peel and stick adhesive to engage the back wall support and the surface on which attached. Alternately, the holder may have an outer housing with a spool that fits into a support structure. When assembled these parts provide a neat, convenience, easily operable holder for the cord.

DESCRIPTION OF THE PRIOR ART

In the prior art various types of holders, organizers and storage devices have been used to store cords. Some, such as U.S. Pat. No. 3,924,819 to E. Lapinskas, use spools to retain the cord with retaining members with cut-out grooves located near the spool's ends. Still others, such as described in U.S. Pat. Nos. 2,834,078 to H. S. Brundage and 4,721,268 to L. Lerner et al., employ an inner cord retaining spool enclosed by an outer housing having cord extending openings. A common housing may serve as a storage housing and the housing for an electrically operated device as in U.S. Pat. No. 3,021,087 to R. W. Rudolph. None of the known prior art discloses a cord holder as disclosed and claimed herein.

SUMMARY OF THE INVENTION

The present invention consists of a cord holder having an outer cup housing with an inner spool, a wall support having an outer cord retaining spool concentric with the inner spool and surface attachment means. An alternate embodiment uses an outer housing with a spool and self-stick tab which engages a support structure. An adjustment member on the outer spool may also be used to firmly hold the cord until the housing is in place.

It is an object of the present invention to provide an improved cord holder.

It is a further object of the present invention to provide a cord holder having an inner spool and an outer cord retaining spool enclosed in one housing.

It is another object of the present invention to provide such a cord holder which can easily be attached to a support structure.

These and other objects and advantages of the present invention will be fully apparent from the following description, when taken in connection with the annexed drawings.

BRIEF DESCRIPTION OF THE DRAWINGS

FIG. 1 is a front view of one embodiment of the invention which uses a cup housing.

FIG. 2 is a cross-sectional side view taken along line 2—2 of the FIG. 1 cup housing.

FIG. 3 is a front view of the back wall support structure for the FIG. 1 embodiment.

FIG. 4 is a cross-sectional side view on line 4—4 of the FIG. 3 support.

FIG. 5 depicts one type of attachment mechanisms useable with either embodiment of the holder.

FIG. 6 shows a cut away sectional view of the FIG. 1 assembled cup housing and wall support structure embodiment before it is attached to an appliance.

DESCRIPTION OF THE PREFERRED EMBODIMENT

Figure 7:
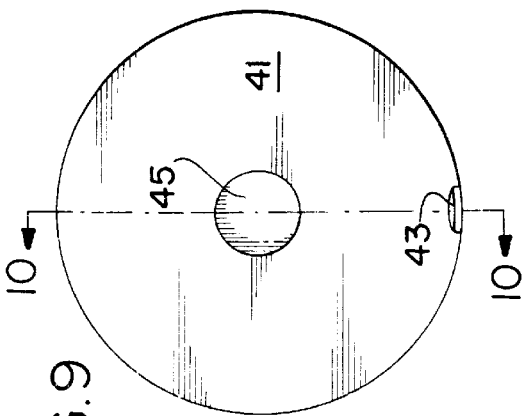
FIG. 7 illustrates a front view of an alternate embodiment of the outer housing.
Figure 8:
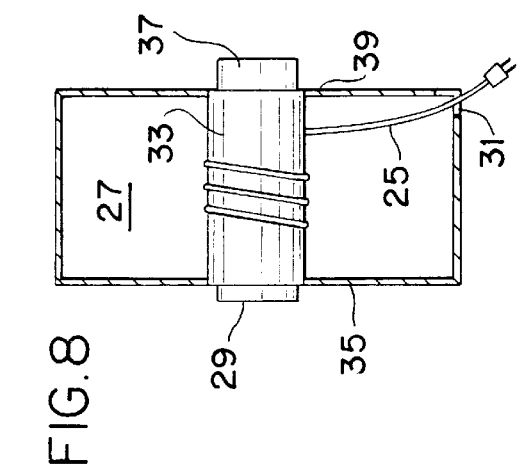
FIG. 8 is a side cross sectional view along line 8—8 of the FIG. 7 housing.

Referring now to the drawings in greater detail, FIG. 1 shows a front view of the circular cup housing 1 with its cord exit opening 3 located near the cup's periphery. As best shown in the cross sectional side view FIG. 2, taken along line 2—2 of FIG. 1, cup housing 1 has an outer surface 5 semi-spherical in shape and an attached inner cylindrical spool 7 which is circular in cross section. Extending from the free end of the spool are protruding spikes 9.

The FIG. 3 front view of the back wall support illustrates a flat circular support member 11 having a peripheral opening 13 similar to that of the cup's cord exit opening 3. Extending from and rigidly attached to the support 11 is outer spool 15 similar in shape to inner spool 7 but larger in cross section diameter than inner spool 7 (see FIG. 4). This outer spool 15 acts as the retaining spool for the stored cord. Also shown in FIG. 4, are a rear self-stick pad 17 and inner 19 and outer 21 extension members attached to the outer spool's 15 free end.

FIG. 5 illustrates a cord holder's attachment self-stick pad 17 engaged with a pad 23 which may the same area size or slightly larger than pad 17. Pad 23 is fixed to an appliance or other support for the cord holder. Hook and loop fasteners, such as Velcro TM, or other types of pads which removably stick to each other and another surfaces can be used as long as the bond is strong enough to support the holder's weight.

FIG. 6 is a partially cut away sectional view of the FIGS. 1–4 first embodiment with its assembled cup housing and cord holder's support attachment. The two mentioned spools (7 and 15) are concentrically aligned with each other and then pushed together in a telescoping manner. The inner spool's spikes 9 engage the interior walls of the surrounding outer spool 15 and act as support spacers while the inner extensions 19 of the outer spool engage the outer surface of the inner spool for the same reason. In this manner the two spools are telescopically joined together and the inner spool and its cup housing can rotate around the outer spool fixed to a supporting appliance, wall or the like. This allows a user to move the cord exit opening 3 in a circular trajectory to unwind or wind a flexible elongated electric wire cord 25 retained on the spool 15. When the described exit opening 3 in the cup housing is at its desired location, the cord may either be withdrawn or wound from spool 15.

Figure 9:
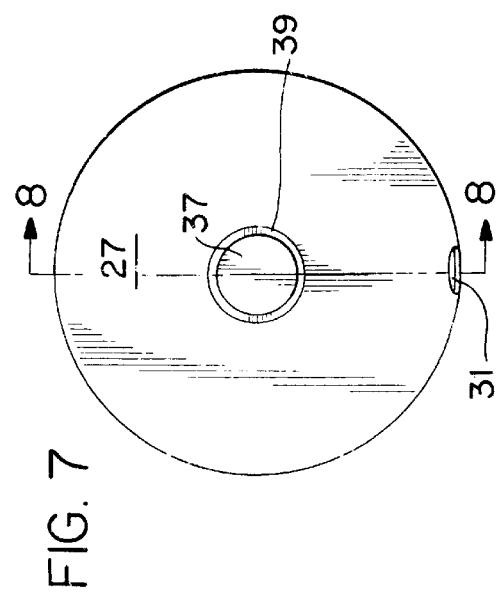
FIG. 9 is a front view of the support structure used with the FIG. 7 embodiment.
Figure 10:
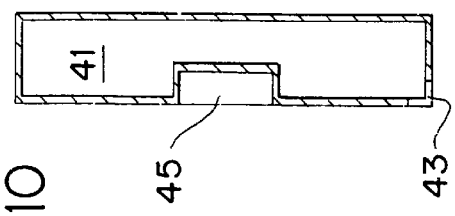
FIG. 10 is a cross sectional side view alone line 10—10 of FIG. 9.

FIGS. 7–11 depict an alternate second embodiment to the FIGS. 1–4 embodiment. In FIG. 7 the flat outer housing 27 has a center rear self-stick member 29 and an optional peripheral cord opening 31. As shown in the cross-sectional side view, FIG. 8, housing 27 cord opening 31 is located on its front lower surface. A cylindrical spool 33, which is circular in cross section, mounts the stored cord 25 and is fixed to the rear surface 35 of the housing. A spool extending member 37 sticks out of the housing's flat front surface 39. The front support for the outer housing surface 39 is shown in FIGS. 9–10. In the FIG. 9 front view the circular flat support 41 has a peripheral cord opening 43 and a center circular flat surface indentation 45. The support's side section view, FIG. 10, shows the support's two flat outer surfaces and the circular indentation 45 which extends partially through the thickness of support 41.

Figure 11:
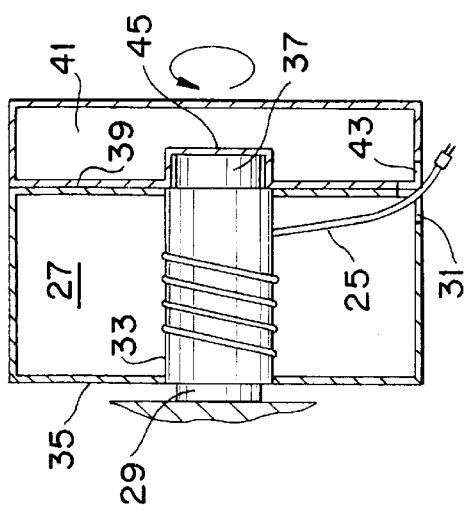
FIG. 11 shows the assembled FIGS. 7–10 alternate embodiment.

The FIG. 11 cross sectional view shows the assembled FIG. 7–10 embodiment. The spool's extension 37 is rotatably mounted in the circular indentation 45 to permit rotation of the outer support 41 with respect to its housing 27. The cord 25 is retained on the outer housing's spool 33 and extends through the opening 43 on the support 41. Rotating support 41 on the spool's extension 37 will allow access to the cord stored on spool 33.

Figure 12:
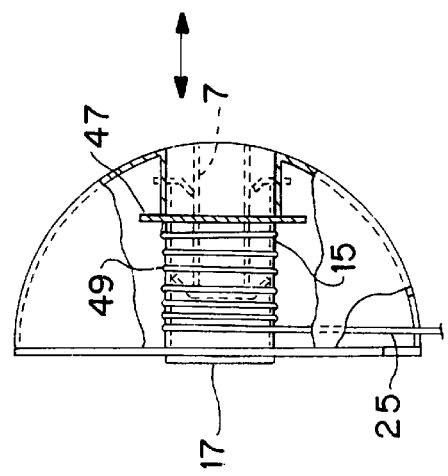
FIG. 12 shows a cord adjustment disk as used with the FIGS. 1–4 embodiment.

FIG. 12 shows a cord retaining improvement useable with either of the two described embodiments. It is described with respect to the FIGS. 1–4 first embodiment. This improvement consists of a circular center holed disk 47 which engages a series of integral continuous spool ridges 49 encircling the outer cord retaining spool 15. An adjustment member (not shown) can be moved forward and backwards on the spool, as shown by the arrows, by rotating it on the engaged surface ridges to hold and secure a retained cord until the cup housing 1 can be assembled in a secure manner to the support 11. By minor modifications the disk 47 could be incorporated into the spool 33 used in the FIGS. 7–10 second embodiment.

While I have mentioned an appliance as the support structure to which may cord holder could be attached, clearly any other adequate structure such as a kitchen, garage or other wall could also be used. With some very slight modifications the shown embodiment of my invention could also be used to include not only electric cords but other elongated flexible members such as ropes, strings, and hoses which can be wound about and stored on a spool. Preferable it should be made of a lightweight moisture resistant material such as a molded plastic material.

Although the Cord Holder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A cord holder comprising:

an outer housing having an inner spool extending inwardly from the housing towards a stationary support mount, said housing having a cord opening through the housing, said support mount having an open ended hollow cord retaining spool extending outwardly towards the housing, said cord retaining spool having a diameter larger than a diameter of the inner spool and a length substantially the same as a length of the inner spool, said cord retaining spool being concentrically mounted on the inner spool by placing said cord retaining spool over the inner spool, said inner spool having spool support spacer members which are disposed on a free end of the inner spool and face in a radially outward direction, said spool support spacer members engage an inner surface of said cord retaining spool to space an outer surface of said inner spool from the inner surface of said cord retaining spool, said cord retaining spool having spool support members which face in a radially inward direction and engage the outer surface of the inner spool near an end of the inner spool opposite the free end to space the outer surface of said inner spool from the inner surface of said cord retaining spool whereby the rotation of the inner spool and the housing with respect to the cord retaining spool permits the withdrawal of stored cord through the cord opening; and means on said support mount for attaching the support mount to a fixed vertical support surface.

2. The invention as claimed in claim 1, wherein said means for attaching the support mount comprises:

at least two self-stick pads one of which is affixed to the support mount and another adapted to be affixed on a surface to which the holder is to be attached.

3. The invention as claimed in claim 2, wherein said outer housing is shaped semi-spherical and said support mount has a circular shaped portion with a peripheral cord receiving opening.

* * * * *